Nov. 2, 1937.  W. H. TUCKER  2,098,073
ELECTRIC MOTOR
Filed Dec. 11, 1936
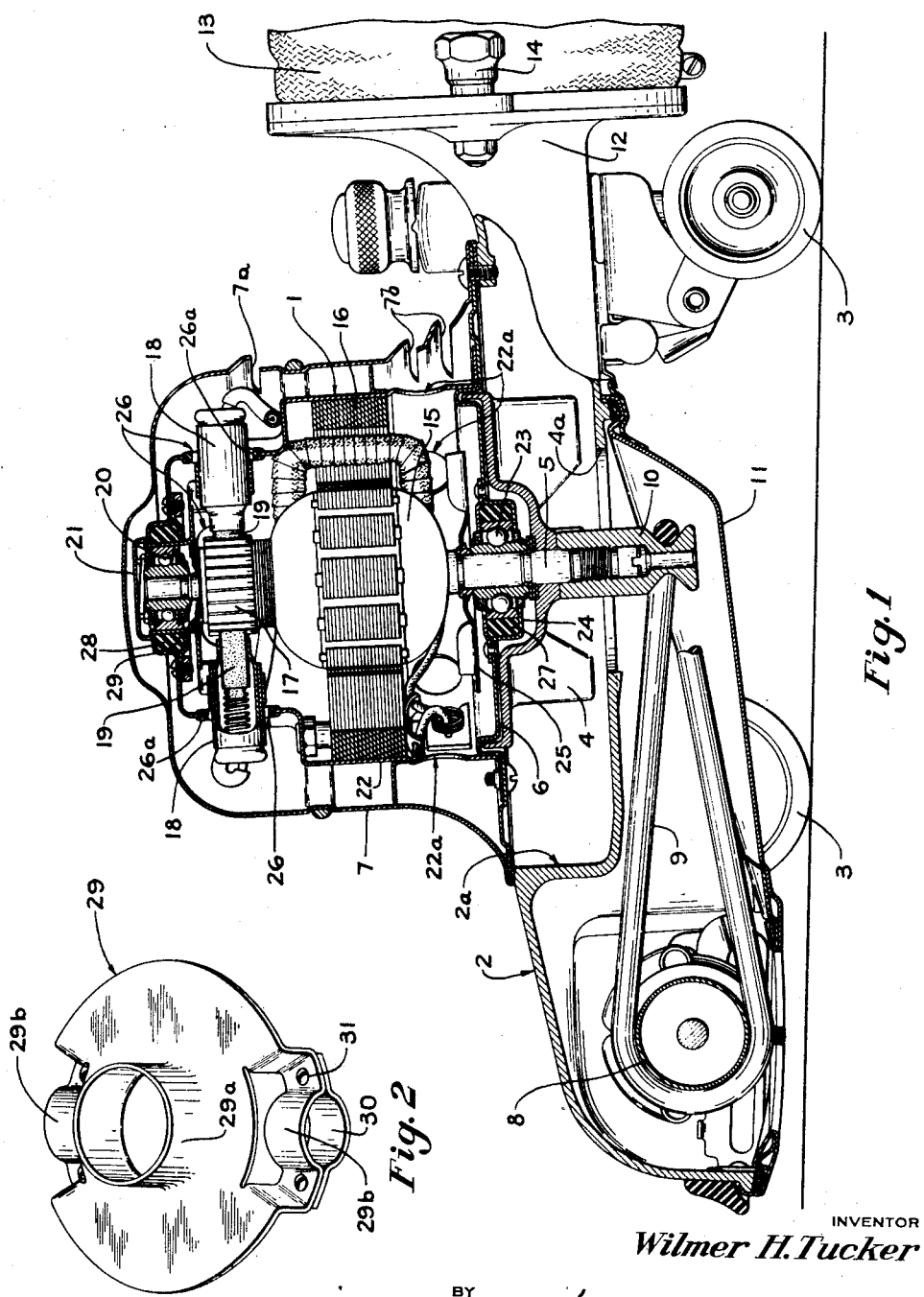
INVENTOR
Wilmer H. Tucker
BY
Harry S. Demarss
ATTORNEY Patented Nov. 2, 1937

2,098,073

UNITED STATES PATENT OFFICE 2,098,073

ELECTRIC MOTOR

Wilmer H. Tucker, Canton, Ohio, assignor to The Hoover Company, North Canton, Ohio, a corporation of Ohio Application December 11, 1936, Serial No. 115,322

5 Claims. (Cl. 171—324)

This invention relates to improvements in electric motors and more particularly to a new and improved mounting for the commutator brushes of an electric motor.

The primary object of the invention is to provide a mounting or support for the brush holder so that the brushes will at all times maintain a fixed relation to the commutator regardless of the amount of distortion or vibration which may result from the various forces acting on the motor shaft.

And a further object of the invention is to provide a resilient bearing for the commutator end of the armature shaft of an electric motor including a support for the brush holder so arranged as to respond to any vibratory movement of the commutator and thus eliminate such inequalities or irregularities in the brush contact as would result in uneven wear and consequent decreased brush life.

The novel features of the improved brush mounting are shown in detail in the accompanying drawing in which Figure 1 is a general view in vertical cross section through the axis of an electric motor incorporated in a suction cleaner of the portable type and Figure 2 is a perspective view of the brush holder support per se as it appears when removed from the bearing assembly of which it forms a part.

As clearly shown in Figure 1, the motor 1 as a complete electrical unit is supported with its axis arranged vertically, upon a casing 2 provided with wheels 3 by which the cleaner is maneuvered over the surface to be cleaned. The motor is supported immediately over a shallow recess or chamber 2a in which rotates a fan 4 suitably mounted upon the lower end of the armature shaft 5 of the motor and immediately below a plate 6 closing the upper end of the fan chamber 2a and forming the lower end wall of the motor. A dome-like hood or cover 7 encloses the motor 1 and is removably secured around its bottom edge to the periphery of the motor supporting plate 6.

The forward end portion of the casing 2 constitutes the nozzle of the cleaner, having a downwardly facing suction mouth and within the nozzle is a rotative agitator 8 which is driven through a belt 9 from a pulley 10 fixed to the extreme lower end of the armature shaft 5 and projecting downwardly through an annular opening or eye 4a leading into the fan chamber from an air passage extending forwardly beneath said fan chamber to the nozzle chamber and formed in part by a removable bottom plate 11. And, finally, the fan chamber 3 is extended rearwardly in the form of an exhaust passage which terminates in a flanged outlet 12 through which a dirt receiving bag 13 is removably attached by means of suitable clamping bolts 14.

Referring now to the motor 1 the same may be assumed to be of a standard type, so far as its electrical make up and characteristics are concerned. Thus, the vertically arranged armature shaft 5 carries the armature or rotor 15 which is surrounded by the stationary field frame 16. Immediately above the armature 15 and adjacent the upper end of the armature shaft 5 is the commutator 17 and extending radially from the commutator in diametric alignment with each other is a pair of tubular brush holders 18, 18 in which are mounted spring pressed brushes 19, 19. The mounting for these brush holders 18, 18 will presently be described in detail.

The upper end of the armature shaft projects a short distance beyond the commutator 17 and is supported in a bearing 20 of the ball type and which in turn is supported within a recess or cavity 21 formed centrally of the top wall of the motor frame 22 preferably having the form of a sheet metal housing completely enclosing the motor assembly and securely fastened around its lower flanged edge to the bottom plate 6. Immediately below the armature 15 is another ball bearing 23 seating in a retaining cavity or recess 24 formed centrally of the bottom plate 6. Mounted on an extension of the armature shaft below the bearing 23 is the fan 4 and agitator drive pulley 10 previously located and identified. A small ventilation fan 25 is mounted upon the armature shaft between the lower bearing 23 and the armature 15, its purpose being to maintain the circulation through the motor in a downward direction, the air entering through a slot 7a near the top of the motor cover 7, thence through a pair of circular openings 26, 26, (through which the outer ends of the brush holders 18, 18 also project) and passing downwardly between the armature and the field coils is finally exhausted through ports 22a in the frame 22 and outlet slots 7b near the bottom of the motor cover 7.

At this point it will be noted in connection with the ports 26, 26, near the top of the motor frame 22, that these are circular openings having a diameter somewhat greater than that of the brush holders 18, 18 and fitting into these enlarged ports are rings 26a of a suitable insulating material which surround the brush holders with sufficient space between to provide not only an inlet for the motor cooling air, but to allow for considerable transverse movement or vibration of the brush holders without contacting the edges of the ports.

Referring now to the lower armature shaft bearing 23, the same is of the standard type consisting of an inner and outer race between which the bearing balls are retained. The only feature to be noted in connection with this lower end bearing is the presence of an annular ring 27 of rubber or other resilient material surrounding the ball bearing assembly and seating snugly in the bearing cavity 24. With this arrangement a certain degree of resiliency is introduced into the bearing whereby any vibration that may occur in the armature shaft or any stresses tending to displace the shaft from its normal axis of rotation, is resisted and absorbed by the resilient ring or collar 27.

The upper shaft bearing follows much the same design and arrangement as the lower bearing, comprising as it does a standard ball bearing 20 immediately surrounding the upper end of the armature shaft and encircling the bearing is a solid ring of rubber or like resilient material 28 seating in the annular bearing cavity 21 in the end wall of the motor frame 22.

However, the novel feature of the upper shaft bearing construction is the incorporation of a support 29 for the tubular brush holders 18, 18.

As clearly shown in Figure 2, this brush holder support 29 preferably has the form of metal stamping consisting of a flat annular body portion having a central opening surrounded by a flange or sleeve 29a drawn or extended axially in one direction and upwardly as shown in Figure 2, and a pair of diametrically opposed U-shaped collar forming elements 29b, 29b, offset from the plane of the body portion. These U-shaped elements form the upper half of a pair of radially disposed collars which are completed by complementary U-shaped stampings 30, 30 which are screwed at 31 to the under face of the offset U-shaped portions 29b, 29b.

Now, referring again to Figure 1 the position of the brush holder supporting plate 29 will be pointed out. In the first place it assumes a position immediately below the upper end bearing 20 with its annular body portion lying in a horizontal plane just above the commutator 17. Thus arranged, the annular flange 29a projects upwardly and between the ball bearing 20 and the outer resilient collar 28. In the assembly operation the outer ball race of the ball bearing 20 is preferably assembled with a driving or press fit into the collar 29a of the brush holder support 29 and then the resilient collar 28 applied to the outside of said collar, with the result that the brush holder becomes an integral part of the ball bearing and as a consequence is connected or supported by the motor frame 22 only through the intermediate resilient collar 28. Manifestly the tubular brush holders 18, 18 are clamped in the clamping collars 29b of the supporting plate so that they assume their normal radial positions in the plane of the commutator and entirely free from contact of any sort with the motor frame 22.

Thus, it will be seen that any vibration or distortion produced in the armature shaft will tend to be absorbed by the resilient ring 28 rather than being transmitted to the motor frame 22 but since the brush holder supporting plate 29 is an integral part of the bearing assembly and not of the motor frame, any such distortion or vibration present in the shaft will be transmitted directly to the brush holders 18, 18 and as a consequence there will be no relative displacement between the brushes and the commutator no matter how violent the vibration in the armature shaft may be.

And in this connection it should be pointed out that distortion and vibration in the armature shaft is quite likely in a motor installation such as herein disclosed, where the axis of the motor is vertical and the driving force is applied at a point below the lower end bearing. So far as the fan 4 is concerned, the resistance offered by the volume of air moved thereby is substantially constant at all times and its axis is coincident with that of the shaft on which it is mounted. But the driving of the agitator puts quite a different type of load on the motor inasmuch as the pull of the belt is transversely to the axis of rotation of the shaft and from a point removed some distance below the lower end bearing and tends to set up a vibration in the shaft which is likely to be magnified and amplified at the commutator end of the shaft. It follows therefore that where the brush holders are mounted on the motor frame, as is the usual arrangement, the brushes would remain stationary while the commutator would be undergoing vibration or displacement from its normal axis of rotation. But with the brushes and their holders supported by and forming an integral part of the bearing which supports the adjacent end of the armature shaft, and the entire bearing assembly resiliently mounted or supported in the solid rubber collar seating in the motor frame, produces an arrangement having the advantage of absorbing or dampening any vibration set up in the armature shaft as well as practically making the brush holders integral with the commutator in the sense that they bear a fixed relationship to each other under all conditions and thereby insuring proper brush contact and consequently a minimum of brush wear.

Having set forth a preferred embodiment of the combined resilient end bearing and brush mounting assembly, I claim:

1. An electric motor comprising a frame, an armature shaft having bearings at the opposite ends of said frame and including a commutator adjacent one end thereof, commutator brush holders disposed radially with respect to said commutator, a supporting member for said brush holders embracing the bearing at the commutator end of the armature shaft, and a resilient member between said supporting member and the motor frame.

2. An electric motor comprising a frame, an armature shaft having bearings at the opposite ends of said frame and including a commutator adjacent one end thereof, commutator brush holders disposed symmetrically with respect to said commutator, a supporting member for said brush holders having an annular portion surrounding the bearing at the commutator end of the shaft, and a ring of resilient material interposed between said supporting member and the motor frame.

3. An electric motor comprising a frame, an armature shaft supported in bearings at the opposite ends of said frame and provided with a commutator adjacent one end thereof, the bearing at the commutator end of said armature shaft including an anti-friction bearing and a bearing retaining ring of resilient material seating in the adjacent end of said frame, a pair of commutator brushes, and brush holders supported by said bearing retaining ring.

4. An electric motor comprising a frame, an armature shaft supported in bearings at the opposite ends of said frame and provided with a commutator adjacent one end thereof, said bearings including anti-friction ball bearing units and resilient seats for said units supported in the ends of said motor frame, and a brush holder including a collar-like support surrounding the ball bearing unit and held within the resilient bearing seat at the commutator end of said frame.

5. An electric motor comprising a frame, an armature shaft, bearings for said armature shaft at the ends of said frame, a commutator mounted on said armature shaft adjacent one of said shaft bearings, commutator brushes, and means for supporting said brushes comprising an annular plate provided with marginal brush holding members and a centrally disposed tubular extension adapted to embrace the adjacent end of said armature shaft, an anti-friction ball-bearing member interposed between said shaft and the extension of said plate and a resilient collar surrounding said sleeve and seating in the adjacent end of said motor frame.

WILMER H. TUCKER.